United States Patent
Aramatsu (10) Patent No.: US 7,515,213 B2
(45) Date of Patent: Apr. 7, 2009

(54) STEREOSCOPIC IMAGE DISPLAY UNIT (75) Inventor: Yoshiaki Aramatsu, Tottori (JP)

(73) Assignees: Sanyo Electric Co., Ltd., Osaka (JP); Tottori Sanyo Electric Co., Ltd., Tottori (JP)

(*) Notice: Subject to any disclaimer, the term of this patent is extended or adjusted under 35 U.S.C. 154(b) by 406 days.

(21) Appl. No.: 10/599,181

(22) PCT Filed: Mar. 10, 2005

(86) PCT No.: PCT/JP2005/004255
§ 371 (c)(1), (2), (4) Date: Sep. 21, 2006

(87) PCT Pub. No.: WO2005/091049
PCT Pub. Date: Sep. 29, 2005

(65) Prior Publication Data
US 2008/0030634 A1 Feb. 7, 2008

(30) Foreign Application Priority Data
Mar. 24, 2004 (JP) ............................. 2004-087356

(51) Int. Cl.
*G02F 1/1335* (2006.01)
(52) U.S. Cl. ............................................. 349/15; 349/1
(58) Field of Classification Search .................... 349/1, 349/15; 348/E13.026, E13.06, 42, 51, 54, 348/58, 39, 60; 359/462, 466
See application file for complete search history.

(56) References Cited

U.S. PATENT DOCUMENTS

| | | | | |
|---|---|---|---|---|
| 7,365,809 | B2* | 4/2008 | Tanaka et al. | 349/15 |
| 2008/0278639 | A1* | 11/2008 | Hamagishi | 349/8 |
| 2008/0278641 | A1* | 11/2008 | Uehara | 349/15 |
| 2008/0284844 | A1* | 11/2008 | Woodgate et al. | 348/E13.001 |
| 2008/0297592 | A1* | 12/2008 | Oyamada et al. | 359/466 |

FOREIGN PATENT DOCUMENTS

| | | |
|---|---|---|
| JP | 3-119889 | 5/1991 |
| JP | 10-142572 | 5/1998 |
| JP | 2001-166259 | 6/2001 |
| JP | 2001-1166259 | 6/2001 |

* cited by examiner

*Primary Examiner*—James P Hughes
(74) *Attorney, Agent, or Firm*—SoCal IP Law Group LLP; Steven C. Sereboff; John E. Gunther (57) ABSTRACT

A three-dimensional image display unit comprising a liquid crystal parallax barrier provided on the surface of an image display unit such as a transmitting liquid crystal display unit across a transparent plate, wherein a shielding member such as a black mask for shielding the outgoing light of a light incident from the side surface of the transparent plate is provided in the vicinity of the boundary of the effective display area of the parallax barrier. The shielding member may be provided inside or outside the parallax barrier. Such a construction can prevent blur forming in the vicinity of the boundary of the effective display area or a deterioration in display quality such as insufficient black displaying at a part that should be black-displayed, thereby providing a three-dimensional image display unit giving a good display quality in the vicinity of the boundary of the effective display area even if it is enlarged in size.

9 Claims, 5 Drawing Sheets

STEREOSCOPIC IMAGE DISPLAY UNIT

NOTICE OF COPYRIGHTS AND TRADE DRESS

This patent claims priority from Japanese Patent Application No. 2004-087356 filed Mar. 24, 2004, and PCT Application No. PCT/JP2005/004255 filed Mar. 10, 2005, both of which are incorporated herein by reference.

TECHNICAL FIELD

The present invention relates to a liquid crystal parallax barrier type stereoscopic image display unit that is capable of three-dimensional displays without the use of special eyeglasses. In particular it relates to a stereoscopic image display unit that is particularly effective when large-sized and gives good display quality in the vicinity of the boundary of the effective display area.

BACKGROUND ART

Figure 3:
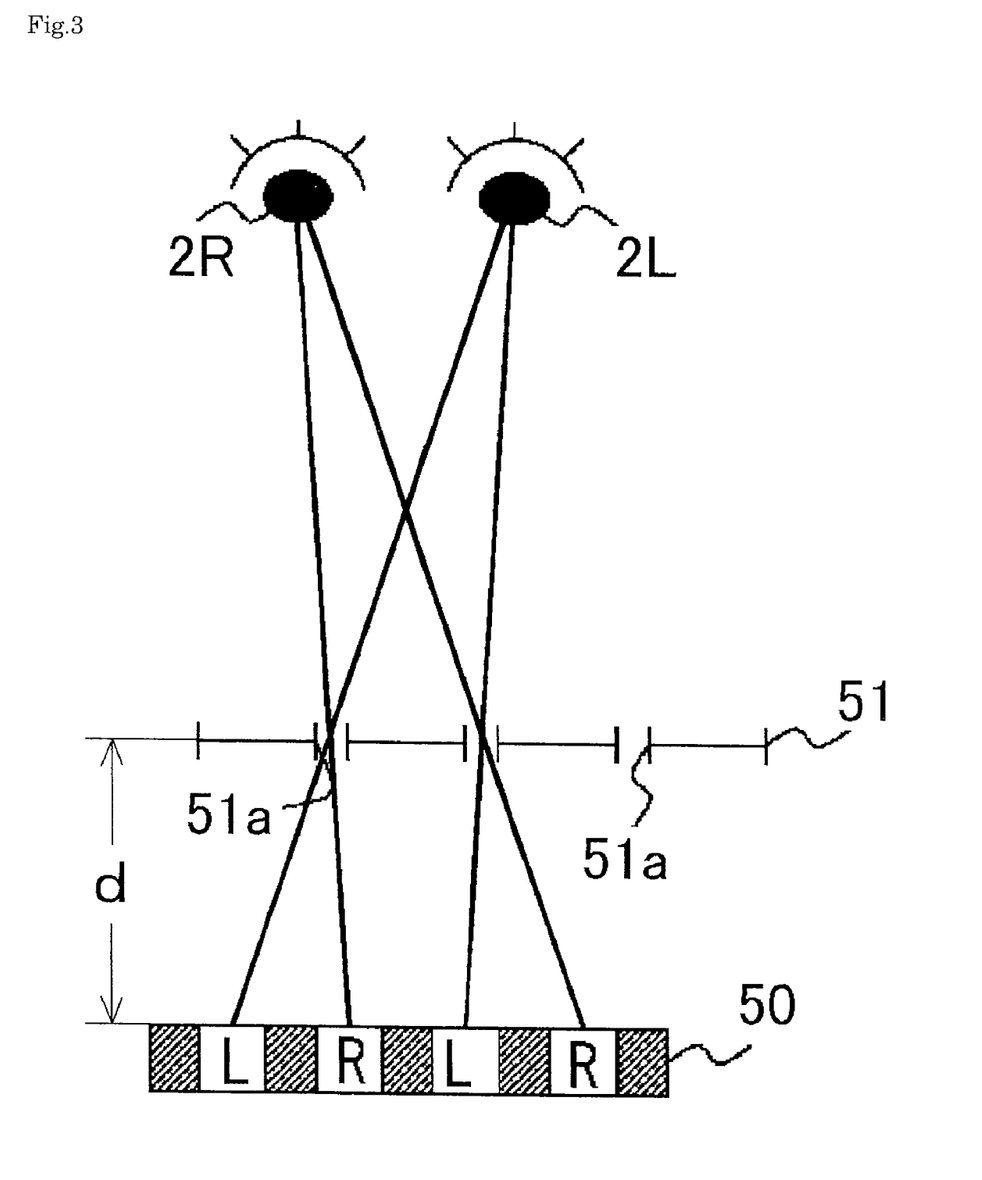
FIG. 3 is schematic diagram illustrating the principle of a liquid crystal parallax barrier type stereoscopic image display unit.

Among methods that have long been proposed for displaying three-dimensional images without the use of special eyeglasses are the lenticular method, the parallax barrier method, and the method of employing a slit light source. FIG. 3 is a schematic diagram showing the principle of the parallax barrier method type stereoscopic image display. The image to be viewed by the viewer is formed in an image display unit 50 including a liquid crystal display panel, plasma display panel or similar. To enable stereoscopic viewing, left-eye pixels L displaying an image for the left eye, and right-eye pixels R displaying an image for the right eye, are arrayed alternately in said image display unit 50. The positional relations of the left-eye pixels L and right eye pixels R will be described later. The image for the left eye and image for the right eye may for example be obtained via simultaneous photography by two cameras, or be derived from a single set of image data via logical operations. The two images so obtained will contain the parallax information necessary for humans to realize stereoscopic vision by means of binocular parallax.

At a certain distance d forward of the image display unit 50, there is deployed a parallax barrier 51 that serves as a shielding barrier. Openings 51a shaped like longitudinal stripes are formed in the parallax barrier 51. Said distance d and the spacing of the openings 51a are determined in accordance with the array of said left-eye pixels L and right-eye pixels R and with the optimal viewing position. By means of the parallax barrier 51 the image for the left eye and the image for the right eye are separated, and the separated left image and right image enter into the left eye 2L and right eye 2R respectively. In this way the viewer is able to view three-dimensional images.

Such a parallax barrier is unchanging, and without modification of such barrier the parallax barrier type stereoscopic image display unit described above is exclusively for three-dimensional displays. Accordingly, in order enable switching between two-dimensional (below, "2D") image displays and three-dimensional (below, "3D") image displays, stereoscopic image display units were developed that use a liquid crystal type item for the parallax barrier provided at the front of the image display unit, implementing 3D displays by having the liquid crystal form a parallax barrier with a black-and-white stripe pattern, and 2D displays by having it form a whole-area transmitting barrier. (See Patent Document 1 below.)

Figure 4:
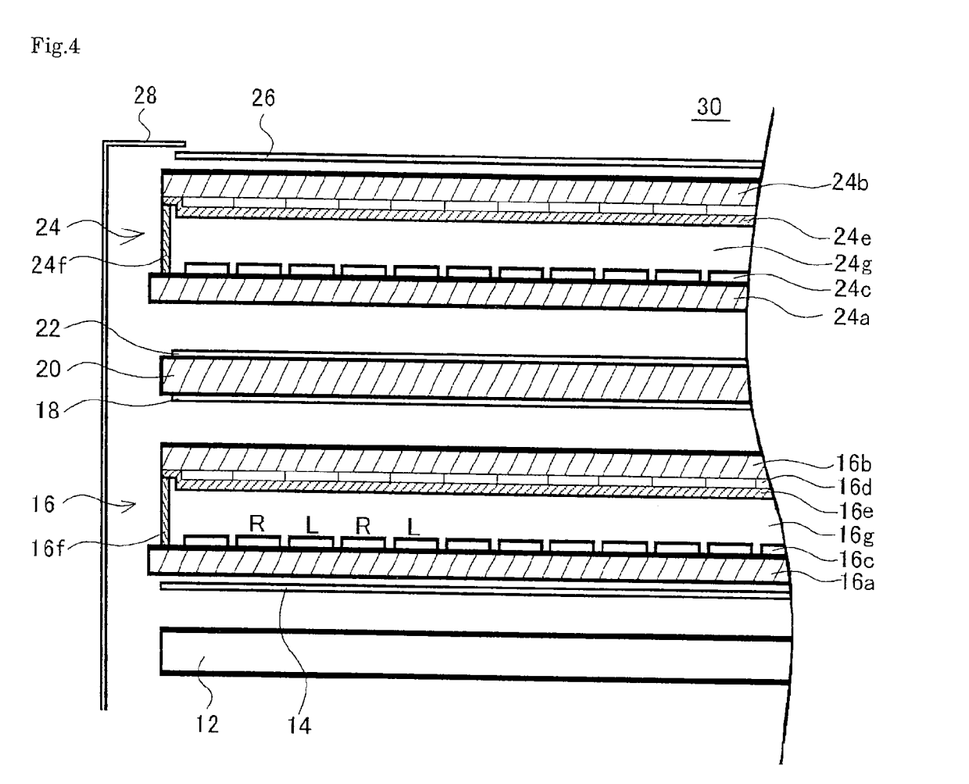
FIG. 4 is a partial exploded cross-sectional view illustrating an example of a prior art liquid crystal parallax barrier type stereoscopic image display unit.

A specific example of such a prior art stereoscopic image display unit employing a liquid crystal parallax barrier is now described with reference to the drawings. FIG. 4 is a partial exploded view of a parallax barrier type stereoscopic image display unit 30 that is equipped with a liquid crystal parallax barrier deployed in front of a liquid crystal panel that serves as the image display unit. In FIG. 4:

a transmitting liquid crystal display panel 16 having an array of display pixels is deployed over the outer face of a backlight 12 with a first polarizing plate 14 interposed;

then a liquid crystal parallax barrier 24 is deployed with a second polarizing plate 18, a transparent plate 20 and a third polarizing plate 22 interposed;

and over the outer face of the liquid crystal barrier 24 is deployed a fourth polarizing plate 26.

The transmitting liquid crystal display panel 16 is composed of:

a rear glass substrate 16a and front glass substrate 16b located respectively on the side where light from the backlight enters and on the side where it exits;

pixel electrodes 16c formed on the inner face of the rear glass substrate 16a;

a color filter 16d and common electrode 16e formed on the inner face of the front glass substrate 16b;

a spacer 16f deployed at the periphery of the space between the rear and front glass substrates 16a, 16b; and liquid crystal 16g sealed in the space between the rear and front glass substrates 16a, 16b.

The pixel electrodes 16c have pixels for the right eye R and pixels for the left eye L deployed alternately so as to form an image for the right eye and an image for the left eye, the pixels being divided by longitudinal stripes (not shown in the drawing).

A transparent glass plate or acrylic plate is used for the transparent plate 20, which is provided in order to maintain a particular distance d (see FIG. 3) between the transmitting liquid crystal display panel 16 and the liquid crystal parallax barrier 24, so as to set the optimal viewing position at a location a certain distance away from the stereoscopic image display unit 30.

In the liquid crystal parallax barrier 24, liquid crystal 24g fills the sealed space contained between two glass substrates 24a, 24b. On the inner face of the glass substrate 24a are formed electrodes 24c for forming black-and-white stripes parallel to the stripes of the pixels L and R of the transmitting liquid crystal display panel 16, while on the inner face of the glass substrate 24b is formed an electrode 24e facing the electrodes 24c. With no voltage applied, the liquid crystal 24g is colorless and transparent so that 2D images are displayed. With voltage applied, the liquid crystal 24g forms black-and-white parallax barrier stripes and 3D images are displayed. More precisely, for 3D displays, XY addresses for the liquid crystal parallax barrier 24 are specified via a microcomputer or similar control means so as to form barrier stripes of any desired shape in any desired positions on the barrier surface, with the resulting 3D images being viewed by the viewer. A conventional, commonly-known transmitting liquid crystal panel can be utilized without modification as the liquid crystal parallax barrier 24 and made to form the black-and-white parallax barrier stripes. Alternatively a liquid crystal parallax barrier that is specially constructed to form black-and-white parallax barrier stripes can be employed. FIG. 4 shows the case where a conventional transmitting liquid crystal panel is utilized without any modification.

With such a liquid crystal parallax barrier type three-dimensional display unit 30, the larger-sized is the stereoscopic image display unit 30, the thicker must the transparent plate 20 be made, in order to locate the optimal viewing position further away from three-dimensional display unit 30, since the viewer and the three-dimensional display unit must be separated by a certain distance in order for the viewer to be able to view the whole of the displayed image well. But when the thickness of the transparent plate 20 is increased, or more specifically, when the transparent plate 20 is made thicker than approximately 5 cm, problems in display quality are observed to occur such as blurring of the image in the vicinity of the boundary of the effective display area of the stereoscopic image display unit, or failure of the portions that should be displayed in black to be displayed sufficiently black. The term "effective display area" is used herein to mean the whole area of the liquid crystal display panel's image display that is visible from the viewer side.

Patent Document 1

Japanese Laid-Open Patent Publication No. 1991-119889 (claims, page 4, FIG. 1)

Patent Document 2

Japanese Laid-Open Patent Publication No. 1995-270745 (claims, FIG. 1)

DISCLOSURE OF INVENTION

Problem to be Solved by the Invention

As a result of many and various investigations into the cause of the above problem, the inventors found out that although the stereoscopic image display unit 30 is provided with a rim 28 to block out light around the periphery, stray beams are present in the interior of the stereoscopic image display unit 30 due to the presence of the backlight 12 and the presence of light that is incident through the outer face of the stereoscopic image display unit 30; and that the fact that such stray beams enter through an edge surface of the transparent plate 20 and exit through the vicinity of the boundary of the effective display area of the parallax barrier 24 leads to the aforementioned deterioration in display quality such as occurrence of blurring and failure of the portions that should be displayed in black to be displayed sufficiently black.

Figure 5:
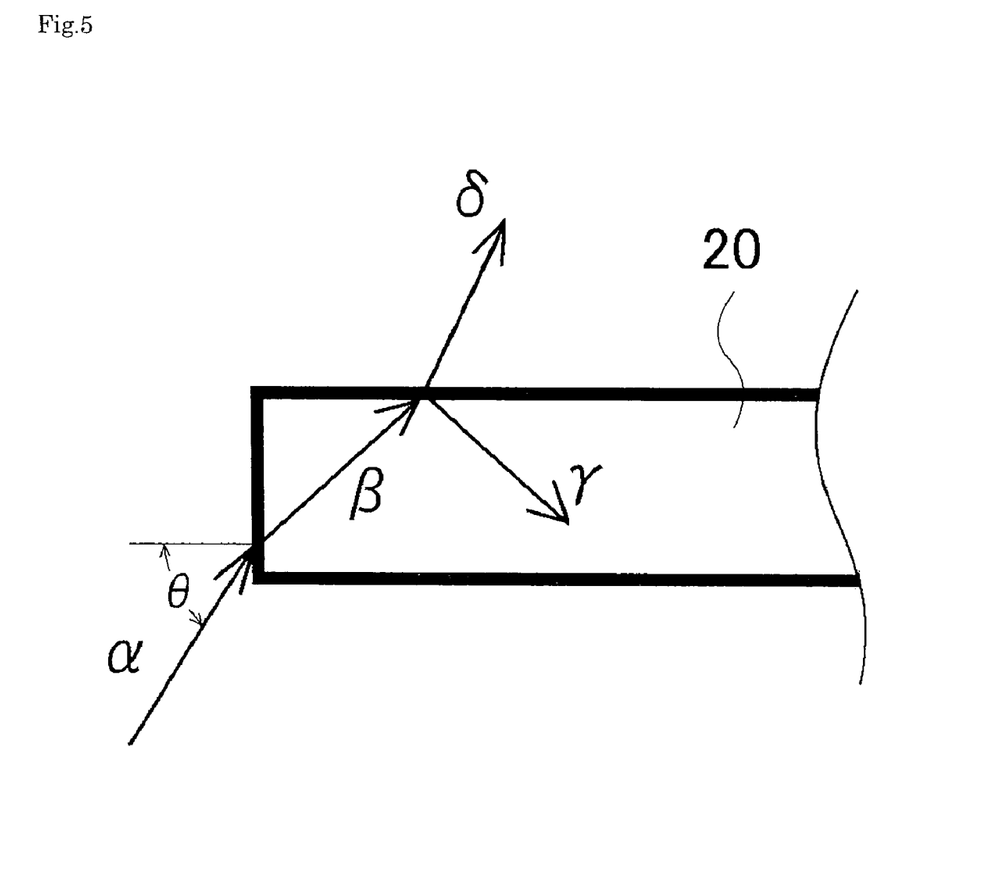
FIG. 5 is an explanatory diagram illustrating the path taken by a stray beam that enters through an edge surface of the transparent plate.

More precisely, as shown in FIG. 5, a stray beam a that is incident through an edge surface of the transparent plate 20 will be present in the interior of the transparent plate 20 as an infiltrating beam β corresponding to the angle of incidence θ. On reaching the front face of the transparent plate 20, such beam will, depending on the angle of incidence, either be fully reflected into the interior, becoming a fully reflected beam γ, or exit through the front face of the transparent plate 20, becoming an exited beam δ. The fully reflected beam γ will not exert any effect on the display quality of the stereoscopic image display unit 30, but the exited beam δ will emerge via the parallax barrier 24 to the viewer and therefore will adversely affect the display quality in such ways as causing blurring in the vicinity of the boundary of the effective display area of the stereoscopic image display unit 30 and failure of the portions that should be displayed in black to be displayed sufficiently black.

If the thickness of the transparent plate 20 is small, exited beams δ will be present only in the vicinity of the end portions of the transparent plate 20 and therefore will have few adverse effects on the display quality in the vicinity of the boundary of the effective display area of the stereoscopic image display unit 30.

Since the adverse effects on the display quality in the vicinity of the boundary of the effective display area of the stereoscopic image display unit 30 are due to stray beams a incident through an edge surface of the transparent plate 20, it will be possible by deploying a shielding member at the edge surface of the transparent plate 20 more or less to eliminate such adverse effects on the display quality in the vicinity of the boundary of the effective display area. However, the manufacturing equipment for conventional image display units such as liquid crystal display panels, although suited to perform various processing of the flat outer faces of glass and acrylic substrates and similar, is not suited to perform processing of the edge surfaces of glass and acrylic substrates and similar. Hence such equipment could not be utilized without modification to provide a shielding member at the edge surface of the transparent plate 20. For such purpose therefore, specialized equipment would be necessary. This would be costly and also pose the problem that space would be required in order to install the specialized equipment.

The inventors arrived at the present invention by finding out, as a result of many and various investigations into structures that might be able to prevent the deterioration of display quality regarding the edge portions of the stereoscopic image display unit's effective display area while permitting the use of manufacturing equipment for conventional image display units such as liquid crystal display panels, that the problem can be entirely solved if it is ensured that any light that may enter through an edge surface of the transparent plate does not exit through the parallax barrier.

More precisely, the present invention is particularly effective for large-sized parallax barrier type stereoscopic image display units, and has as its purpose to provide a stereoscopic image display unit that is free of deterioration in display quality in the vicinity of the boundary of the effective display area.

Means to Resolve the Problem

The aforementioned purpose of the present invention can be achieved by means of the structures now described below. Namely:

The present invention relating to claim 1 is a stereoscopic image display unit that has a parallax barrier deployed over the outer face of an image display unit with a transparent plate interposed, and includes the innovative feature of being provided, in the vicinity of the boundary of said parallax barrier's effective display area, with a shielding member for blocking light that has entered through an edge surface of said transparent plate.

The present invention relating to claim 2 is the stereoscopic image display unit of claim 1 with the further feature that said transparent plate is a glass substrate.

The present invention relating to claim 3 is the stereoscopic image display unit of claim 1 or claim 2 with the further feature that the thickness of said transparent plate is 5 cm or greater.

The present invention relating to claim 4 is the stereoscopic image display unit of claim 1 with the further feature that said shielding member includes a black mask.

The present invention relating to claim 5 is the stereoscopic image display unit of claim 1 with the further feature that said parallax barrier is a liquid crystal parallax barrier.

The present invention relating to claim 6 is the stereoscopic image display unit of claim 5 with the further feature that said shielding member is provided in the interior of said liquid crystal parallax barrier.

The present invention relating to claim 7 is the stereoscopic image display unit of claim 6 with the further feature that said shielding member is provided between said liquid crystal parallax barrier's common electrode and outer face-side glass substrate.

The present invention relating to claim 8 is the stereoscopic image display unit of claim 5 with the further feature that said shielding member is provided on the outer face of said liquid crystal parallax barrier's glass substrate that faces said transparent plate.

The present invention relating to claim 9 is the stereoscopic image display unit of any of claims 5 to 8 with the further feature that said shielding member includes a black mask.

Effects of the Invention

Thanks to the employment of the foregoing structures, the stereoscopic image display unit of the present invention yields the excellent effects now described below. Namely:

According to the stereoscopic image display unit of claim 1 of the present invention, a shielding member for blocking light that has entered through an edge surface of said transparent plate is provided in the vicinity of the boundary of the parallax barrier's effective display area, so that even in the case where the transparent plate is thick and stray light entering through the edge surface of the transparent plate would, with the conventional structure, exit through the parallax barrier, such light will be blocked out by said shielding member and thus will not emerge from the parallax barrier. As a result, deterioration in the display quality such as blurring of the image in the vicinity of the boundary of the effective display area of the stereoscopic image display unit, or failure of the portions that should be displayed in black to be displayed sufficiently black, will not occur.

According to the stereoscopic image display unit of claim 2 of the present invention, a glass plate or an acrylic resin plate may be used for said transparent plate; if a glass plate is used, then due to its high strength there will little deformation even when the stereoscopic image display unit is large-sized, and hence it will be possible to obtain a stereoscopic image display unit with good display quality.

According to the stereoscopic image display unit of claim 3 of the present invention, the thickness of the transparent plate is 5 cm or greater, so that the beneficial effects of applying the present invention are manifested to a pronounced degree. This is because, owing to the relation between the transparent plate's refractive index and thickness, it is when the thickness of the transparent plate is 5 cm or greater that deterioration in the display quality such as blurring of the image in the vicinity of the boundary of the effective display area of the stereoscopic image display unit or failure of the portions that should be displayed in black to be displayed sufficiently black, becomes markedly noticeable. The upper limit on the transparent plate's thickness is determined according to the distance between the viewer and the stereoscopic image display unit, and hence is not of critical significance. But the longer that distance is, the thicker it will be necessary to make the transparent plate, and an overthick transparent plate will weigh so much as to be impractical. Accordingly, such upper limit should preferably be set at around 10 cm.

According to the stereoscopic image display unit of claim 4 of the present invention, it is easily possible, by using commonly-known photolithographic processes, to form as the shielding member a black mask, which is a well-known shielding means.

According to the stereoscopic image display unit of claim 5 of the present invention, the liquid crystal parallax barrier can in a simple manner be made to form black-and-white stripes of any desired width and spacing, or rendered transparent over its entire surface, so that the unit can switch with ease between a 2D display and a 3D display.

According to the stereoscopic image display unit of claim 6 of the present invention, said shielding member is provided in the interior of said liquid crystal parallax barrier, so that light that has entered through the edge surface of the transparent plate can be prevented from exiting through the liquid crystal parallax barrier without the provision of a shielding member in a separated location. Hence it is possible to prevent deterioration of display quality in the vicinity of the boundary of the effective display area in a simple manner while using without modification the component elements of a conventional stereoscopic image display unit.

According to the stereoscopic image display unit of claim 7 of the present invention, the liquid crystal parallax barrier is formed between the outer face-side glass substrate and common electrode. This enables a commonly-known shielding member to be formed with ease using commonly-known photolithographic processes, ahead of formation of the common electrode. Moreover, where the conventional manufacturing equipment for liquid crystal panels is used to provide a filter member between said outer face-side glass substrate and the common electrode, such filter member and said shielding member can be formed simultaneously.

According to the stereoscopic image display unit of claim 8 of the present invention, it is possible to form said shielding member with ease while utilizing without modification a prior art liquid crystal parallax barrier.

According to the stereoscopic image display unit of claim 9 of the present invention, it is easily possible, by using commonly-known photolithographic processes, to form as the shielding member a black mask, which is a well-known shielding means.

REFERENCE NUMERALS 10, 10', 30 Stereoscopic image display unit
12 Backlight
14, 18, 22, 26 Polarizing plate
16 Transmitting liquid crystal panel
16a, 16b, 24a, 24b Glass substrate
16c, 24c Pixel electrodes
16d Color filter
16e, 24e Common electrode
16f, 24f Spacer
20 Transparent plate
24 Liquid crystal parallax barrier
28 Rim
29, 29' Shielding member

BEST MODE FOR CARRYING OUT THE INVENTION

Embodiments of the present invention will now be described in detail with reference to the drawings. However, the embodiments below represent merely illustrative instances of stereoscopic image display units for realizing the technical thought of the present invention; these embodiments are not intended to limit the present invention to these particular stereoscopic image display units. The invention can be equally well applied in other embodiments contained in the scope of the claims.

Embodiment 1

Figure 1:
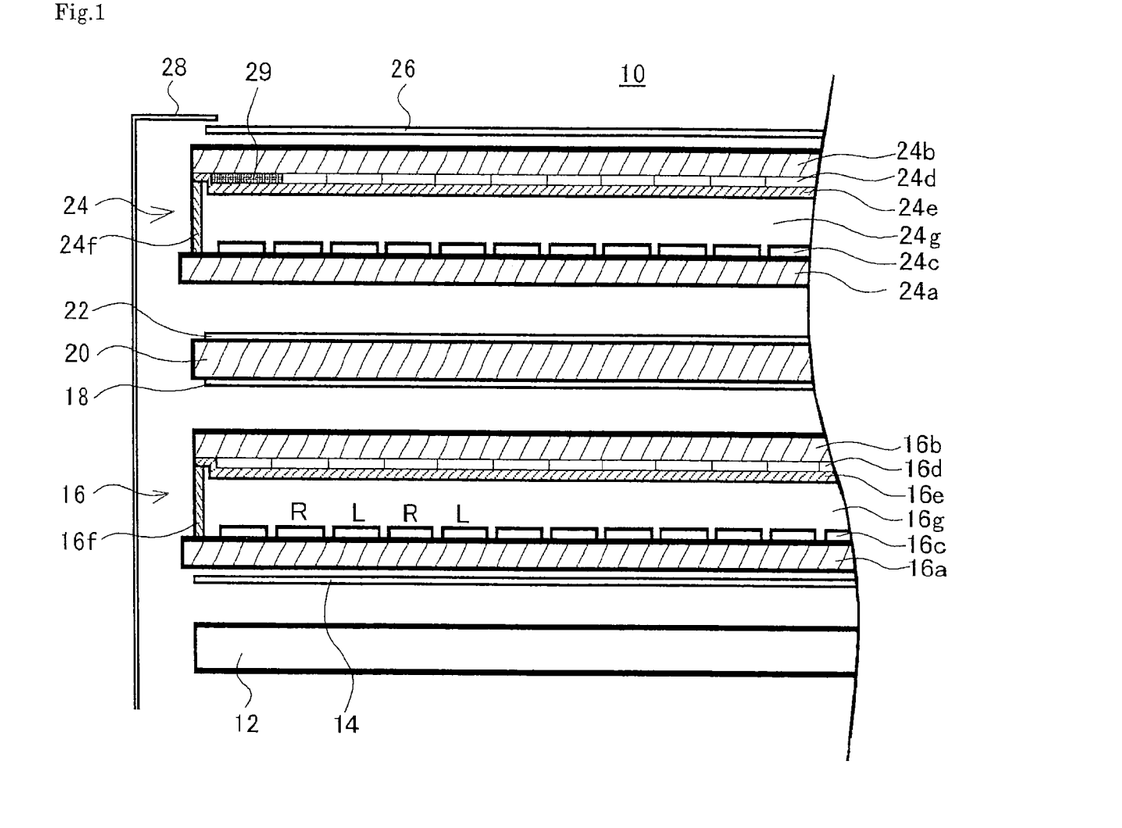
FIG. 1 is a partial exploded cross-sectional view illustrating the liquid crystal parallax barrier type stereoscopic image display unit of Embodiment 1.

FIG. 1 is a partial exploded cross-sectional view of a parallax barrier type stereoscopic image display unit 10 of Embodiment 1. Those components in FIG. 1 that are the same as or similar to those of the prior art parallax barrier type stereoscopic image display unit in said FIG. 4 are given the same or similar reference numerals, and detailed descriptions of such same or similar components are omitted. In this parallax barrier type stereoscopic image display unit 10:

a transmitting liquid crystal display panel 16 having an array of display pixels is deployed over the outer face of a backlight 12 with a first polarizing plate 14 interposed;

then a liquid crystal parallax barrier 24 is deployed with a second polarizing plate 18, a transparent plate 20 of, for example, glass, and a third polarizing plate 22 interposed;

and over the outer face of the liquid crystal parallax barrier 24 is deployed a fourth polarizing plate 26.

In the liquid crystal parallax barrier 24, liquid crystal 24g fills the sealed space contained between two glass substrates 24a, 24b. On the inner face of the glass substrate 24a are formed electrodes 24c for forming black-and-white stripes parallel to the stripes of the pixels L and R of the transmitting liquid crystal display panel 16, while on the inner face of the glass substrate 24b is formed an electrode 24e facing the electrodes 24c.

With no voltage applied, the liquid crystal 24g is colorless and transparent so that 2D images are displayed. With voltage applied, the liquid crystal 24g forms black-and-white parallax barrier stripes and 3D images are displayed.

Between the liquid crystal parallax barrier 24's outer face-side glass substrate 24b and common electrode 24e, in the vicinity of the boundary of the effective display area of the liquid crystal parallax barrier 24, there is formed by commonly-known lithographic processes a shielding member 29 such as a black mask. FIG. 1 shows an example where a transmitting liquid crystal display panel is used as the liquid crystal parallax barrier 24, and accordingly there is a filter member 24d provided between outer face-side glass substrate 24b and common electrode 24e, but such filter member 24d is not necessarily needed and therefore may be omitted.

The extent over which the black mask or other shielding member 29 can be provided will vary with the thickness of the transparent plate 20 and therefore has no critical limit; it will suffice to determine such extent experimentally so that the effective display area will not be rendered excessively narrow.

With the adoption of such structure, even where the transparent plate 20 has a large thickness and stray beams that have entered through an edge surface of the transparent plate 20 enter inside the liquid crystal parallax barrier 24, such beams will be blocked by the black mask or other shielding member 29 and hence will not emerge through the outer face of the parallax barrier 24. As a result, deterioration in the display quality such as blurring in the vicinity of the boundary of the effective display area of the stereoscopic image display unit 10, or failure of the portions that should be displayed in black to be displayed sufficiently black, will seldom occur.

Embodiment 2

Figure 2:
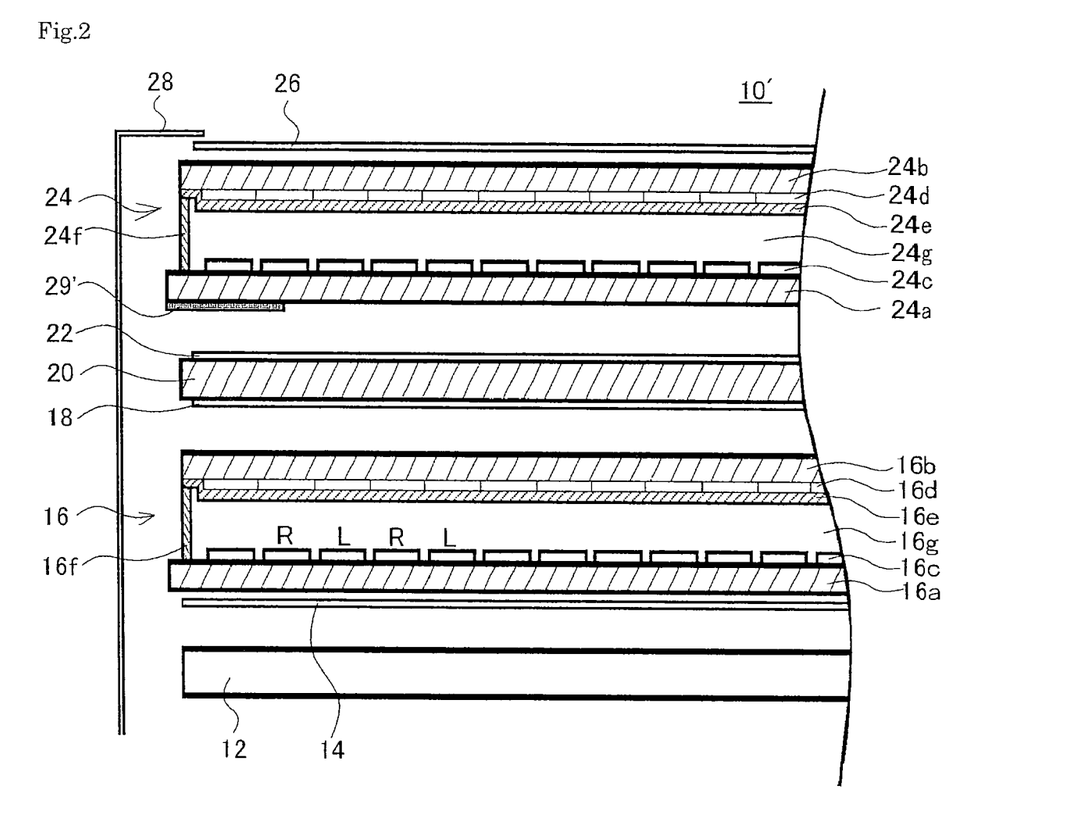
FIG. 2 is a partial exploded cross-sectional view illustrating the liquid crystal parallax barrier type stereoscopic image display unit of Embodiment 2.

FIG. 2 is a partial exploded cross-sectional view of a parallax barrier type stereoscopic image display unit 10' of Embodiment 2. Those components in FIG. 2 that are the same as or similar to those of the Embodiment 1 parallax barrier type stereoscopic image display unit 10 in said FIG. 1 are given the same or similar reference numerals, and detailed descriptions of such same or similar components are omitted.

The parallax barrier type stereoscopic image display unit 10' of Embodiment 2 differs structurally from the stereoscopic image display unit 10 of Embodiment 1 in that the black mask or other shielding member 29' is provided not in the interior of the liquid crystal parallax barrier 24 but on the outer face of the liquid crystal parallax barrier 24's glass substrate 24a, which faces the transparent plate 20.

When such structure is employed, not only will it be easy to provide the black mask or other shielding member 29' on the outer face of the glass substrate 24a using the manufacturing equipment for conventional liquid crystal display panels, but also it will be possible to utilize a transmitting liquid crystal display panel without modification as the liquid crystal parallax barrier 24, so that there will be no particular need to use an item designed exclusively for the purpose as the liquid crystal parallax barrier 24. Hence it will be possible to obtain at low cost a stereoscopic image display unit 10' in which deterioration in the display quality in the vicinity of the boundary of the effective display area will seldom occur.

Embodiments 1 and 2 above show examples that use a transmitting liquid crystal display panel as the image display unit, but the present invention is not limited to this and can equally well be applied to other commonly-known image display units such as a plasma display panel, a cathode ray tube display unit, or a projecting image display unit.

Moreover, although embodiments 1 and 2 above show examples that use a liquid crystal parallax barrier as the parallax barrier, such embodiments could alternatively use a parallax barrier with permanent black-and-white stripes, where it is desired to have a unit that is exclusively for 3D displays.

Furthermore, although the effects of the present invention will be the more pronounced the closer is said black mask or other shielding member to the parallax barrier, such member may where necessary be provided on the parallax barrier-side face of the transparent plate.

It is claimed:

1. A stereoscopic image display unit comprising:
   a parallax barrier located over the outer face of an image display device;
   a transparent plate interposed between the parallax barrier and the image display device; and
   a shielding member in the vicinity of the boundary of said parallax barrier's effective display area;
   and wherein the shielding member blocks light that has entered through an edge surface of said transparent plate.

2. The stereoscopic image display unit according to claim 1, wherein said transparent plate is a glass substrate.

3. The stereoscopic image display unit according to claim 1 or claim 2, wherein the thickness of said transparent plate is 5 cm or greater.

4. The stereoscopic image display unit according to claim 1, wherein said shielding member includes a black mask.

5. The stereoscopic image display unit according to claim 1, wherein said parallax barrier is a liquid crystal parallax barrier.

6. The stereoscopic image display unit according to claim 5, wherein said shielding member is provided in the interior of said liquid crystal parallax barrier.

7. The stereoscopic image display unit according to claim 6, wherein said shielding member is provided between said liquid crystal parallax barrier's common electrode and outer face-side glass substrate.

8. The stereoscopic image display unit according to claim 5, wherein said shielding member is provided on the outer face of said liquid crystal parallax barrier's glass substrate that faces said transparent plate.

9. The stereoscopic image display unit of any of claims 5 to 8, wherein said shielding member includes a black mask.

* * * * *